(12) United States Patent
Goulet

(10) Patent No.: US 9,038,860 B2
(45) Date of Patent: May 26, 2015

(54) GRANULAR FOOD DISPENSER INSTALLED UNDER A CUPBOARD

(76) Inventor: Dany Goulet, Rouyn (CA)

( * ) Notice: Subject to any disclaimer, the term of this patent is extended or adjusted under 35 U.S.C. 154(b) by 6 days.

(21) Appl. No.: 13/600,409

(22) Filed: Aug. 31, 2012

(65) Prior Publication Data
US 2013/0048677 A1 Feb. 28, 2013

(30) Foreign Application Priority Data

Aug. 31, 2011 (GB) .................................. 1114937.4

(51) Int. Cl.
| | |
|---|---|
| B67D 7/06 | (2010.01) |
| A47F 1/08 | (2006.01) |
| A47F 1/02 | (2006.01) |
| A47J 47/04 | (2006.01) |

(52) U.S. Cl.
CPC ... *A47F 1/08* (2013.01); *A47F 1/02* (2013.01); *A47J 47/04* (2013.01)

(58) Field of Classification Search
CPC ........ A47B 71/00; A47B 75/00; A47B 77/16; A47B 77/18; A47F 1/00; A47F 1/02; A47F 1/03; A47F 1/08; A47F 2001/08; A47F 2001/10; A47J 47/01; A47J 47/04; B65D 83/06
USPC .............. 222/156, 158, 160, 180, 181.1, 460, 222/461, 511, 517
See application file for complete search history.

(56) References Cited

U.S. PATENT DOCUMENTS

| | | | |
|---|---|---|---|
| 410,990 A * | 9/1889 | Raymond | 222/517 |
| 479,151 A * | 7/1892 | Menze | 222/430 |
| 1,029,431 A | 6/1912 | Elliott et al. | |
| 1,081,151 A | 12/1913 | Ritter | |
| 1,926,138 A * | 9/1933 | Brinton, Jr. | 222/476 |
| 2,275,703 A | 3/1942 | Trester et al. | |
| 2,626,089 A | 1/1953 | Osfar | |
| 2,822,957 A * | 2/1958 | Johnson | 222/610 |
| 4,243,158 A | 1/1981 | Negosta | |
| 4,948,012 A | 8/1990 | Snediker et al. | |
| 5,222,634 A | 6/1993 | Hayes | |
| 5,593,067 A | 1/1997 | Shaw et al. | |
| 5,720,547 A * | 2/1998 | Baird | 312/107 |
| 5,743,438 A * | 4/1998 | Sokolnicki | 222/181.1 |
| 5,826,754 A | 10/1998 | Ishaya et al. | |
| 2002/0162847 A1 * | 11/2002 | Roy | 221/34 |
| 2006/0049207 A1 | 3/2006 | Bogoshian et al. | |

FOREIGN PATENT DOCUMENTS

EP 0066422 12/1982

* cited by examiner

*Primary Examiner* — Patrick M Buechner

(57) ABSTRACT

A food dispenser for attaching underneath a cupboard, wherein the dispenser has a bin member having four side walls and a dispensing hatch at a bottom portion thereof, and bin channels formed in top portions of two opposite of the side walls, and a support bracket adapted to be securely attached underneath the cupboard having four side edges, wherein two opposite side edges have support channels adapted to engage respective bin channels of the bin member opposite side walls, such that the bin member can slide on and off the support bracket. The dispensing hatch is pivotally attached to one of the four side walls of the bin member, such that the hatch can be pivotally opened and closed such that food can be extracted from the bin member.

8 Claims, 6 Drawing Sheets

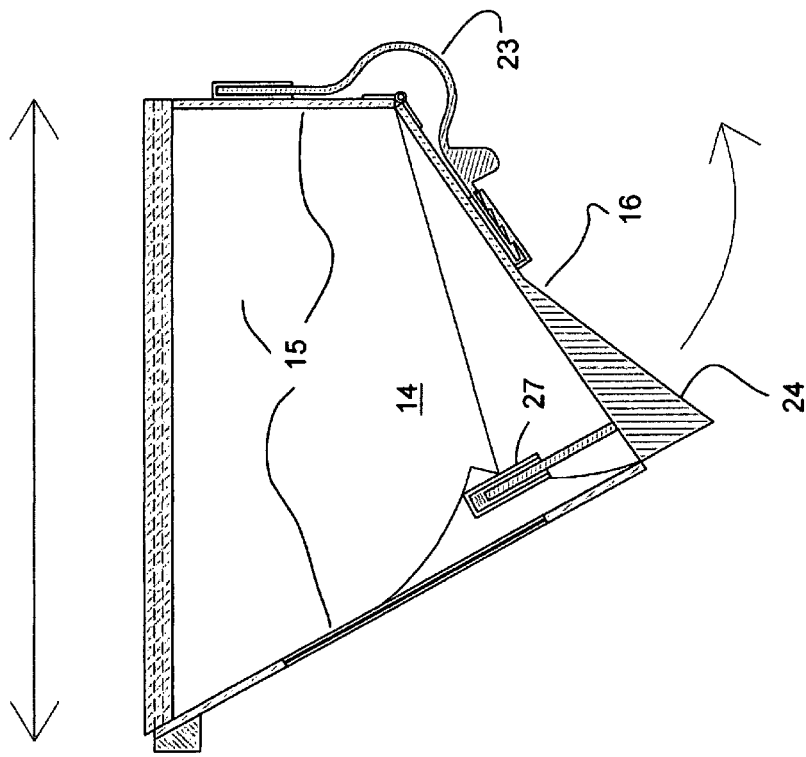
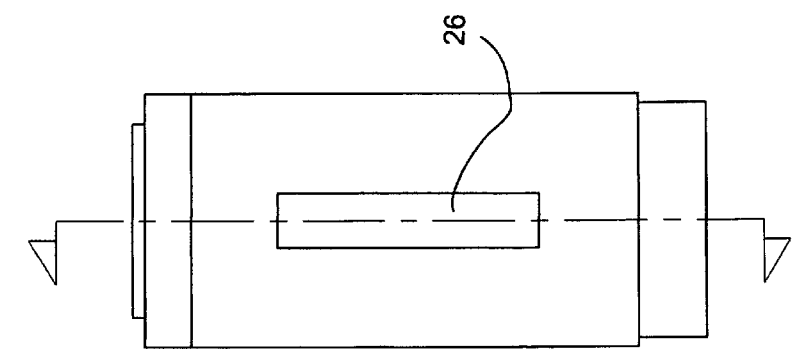

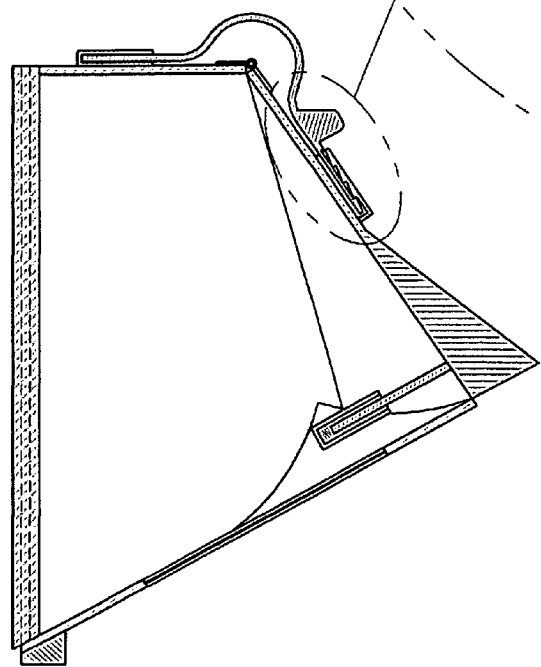
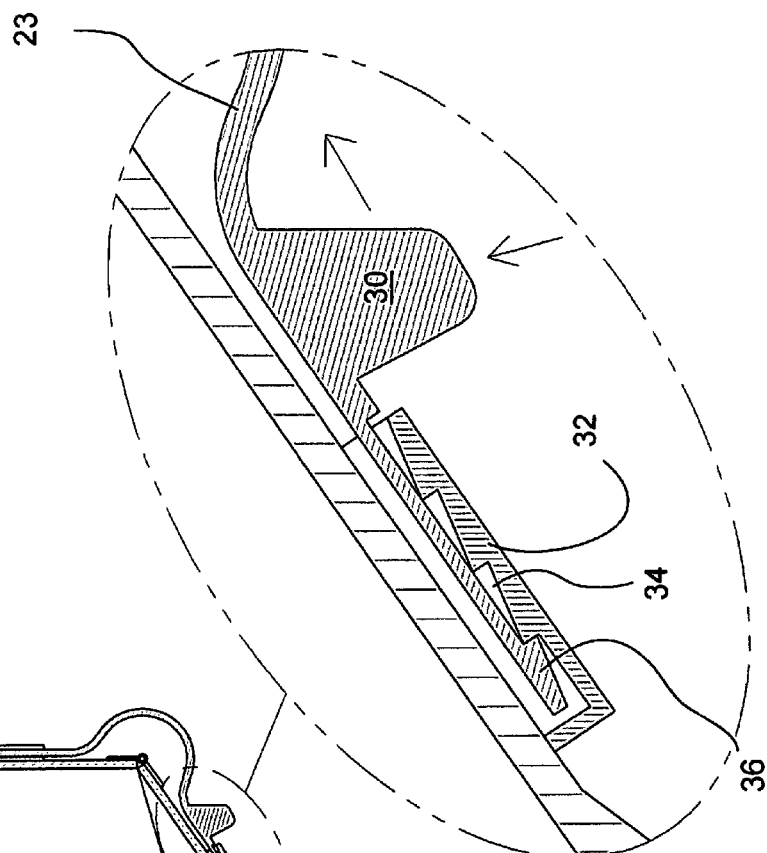
FIG. 4a
FIG. 4b

GRANULAR FOOD DISPENSER INSTALLED UNDER A CUPBOARD

FIELD OF THE INVENTION

The present invention relates generally to dispensers but more particularly to a granular food dispenser installed under a cupboard.

BACKGROUND OF THE INVENTION

There are many types of dispensers. Some of those dispensers are designed for use with foodstuff and of that group, some are specific to dry, granular types of foodstuff such as cereals, sugar, candies, etc.

SUMMARY OF THE INVENTION

In view of the foregoing disadvantages inherent in the known devices now present in the prior art, the present invention, which will be described subsequently in greater detail, is to provide objects and advantages which are:

To provide for a mechanically simple and practical dispenser that is conveniently located under a cupboard so as to minimize its use of space.

In order to do so, the invention consists of a food dispenser for attaching underneath a cupboard, wherein the dispenser has a bin member having four side walls and a dispensing hatch at a bottom portion thereof, and bin channels formed in top portions of two opposite of the side walls, and a support bracket adapted to be securely attached underneath the cupboard having four side edges, wherein two opposite side edges have support channels adapted to engage respective bin channels of the bin member opposite side walls, such that the bin member can slide on and off the support bracket. The dispensing hatch is pivotally attached to one of the four side walls of the bin member, such that the hatch can be pivotally opened and closed such that food can be extracted from the bin member. An adjustable biasing member is attached between one of the four side walls of the bin portion and the dispensing hatch, such that a user must apply a pulling force to open the hatch and dispense food, and when done the adjustable biasing member pushes the hatch back into a closed position against the bottom portion of the bin member.

The food dispenser has the dispensing hatch include a handle member adapted for a user to grab and pull down the dispensing hatch into an open position allowing food to be extracted.

The food dispenser further comprises a flap member that extends upwards therefrom and into the interior of the bin member, such that when the hatch is being closed the flap member stops the flow of the food from being dispensed and the hatch can close without interference from the food.

The food dispenser has the bin member further comprise a window member on a front side thereof adapted to allow a user to visually monitor the amount of food that is in the bin member.

The food dispenser has the adjustable connection between the adjustable biasing member and the dispensing hatch comprise a first connecting portion having a plurality of teeth aligned linearly, wherein the first connecting portion is attached to an underside of the dispensing hatch, and a second connecting portion located on the adjustable biasing member and having a complimentary tooth that is adapted to engage any one of the teeth of the first connecting portion.

The food dispenser is generally used in combination with a cupboard wherein the connection between the support bracket and the cupboard can be formed by connectors chosen from a list of connectors including screws, nails, and glue.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 2a-b Front and cutaway side views.

FIGS. 4a-b Cutaway side and cutaway side detail of the adjustable biasing member.

DETAILED DESCRIPTION OF THE PREFERRED EMBODIMENT

Figure 1:
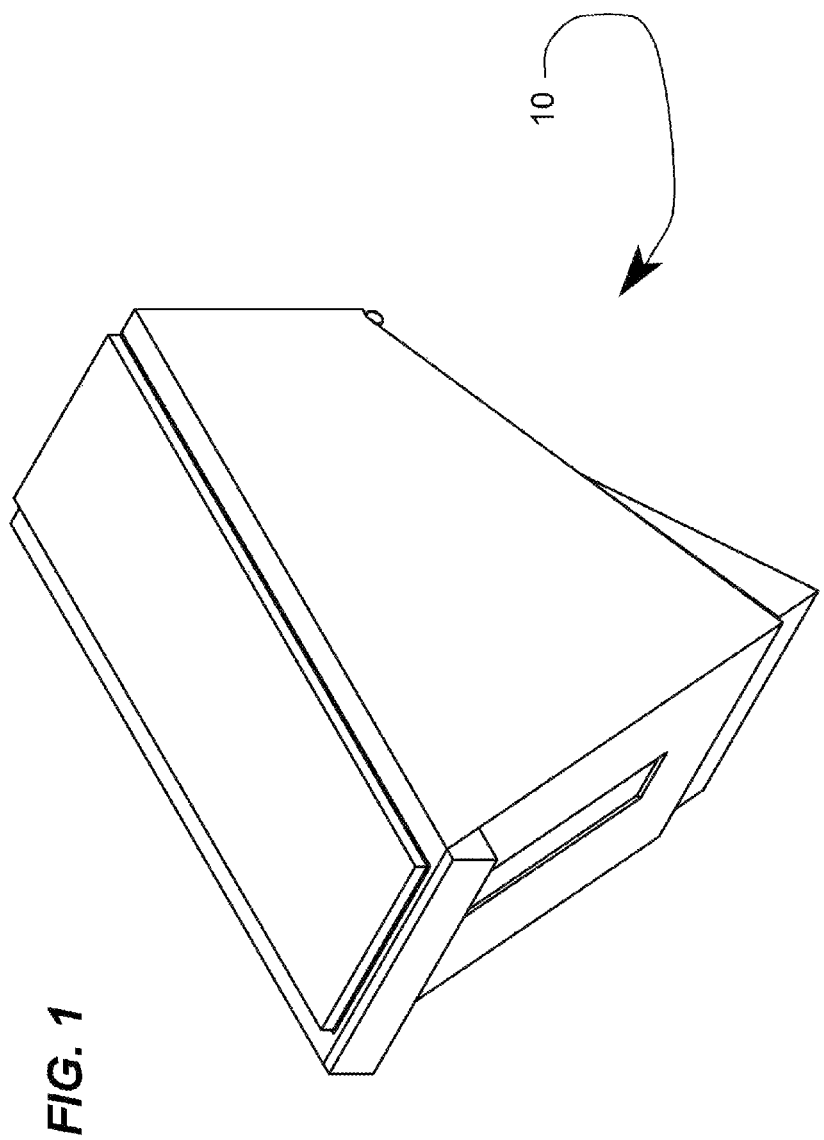
FIG. 1 Isometric view of the invention.
Figure 3:
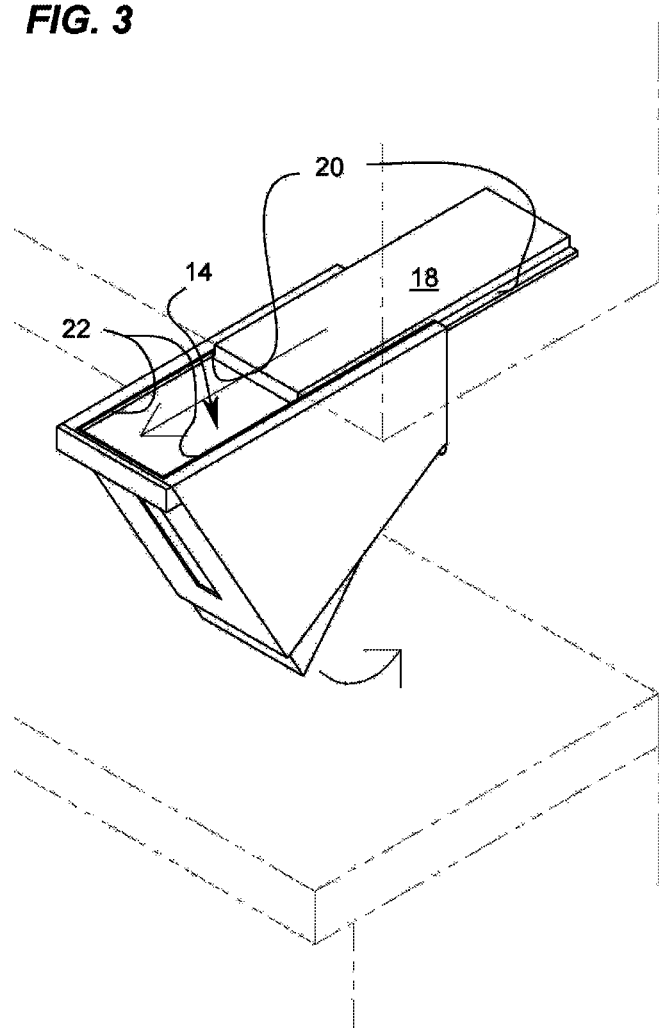
FIG. 3 Isometric view showing the sliding into the channels.
Figure 5:
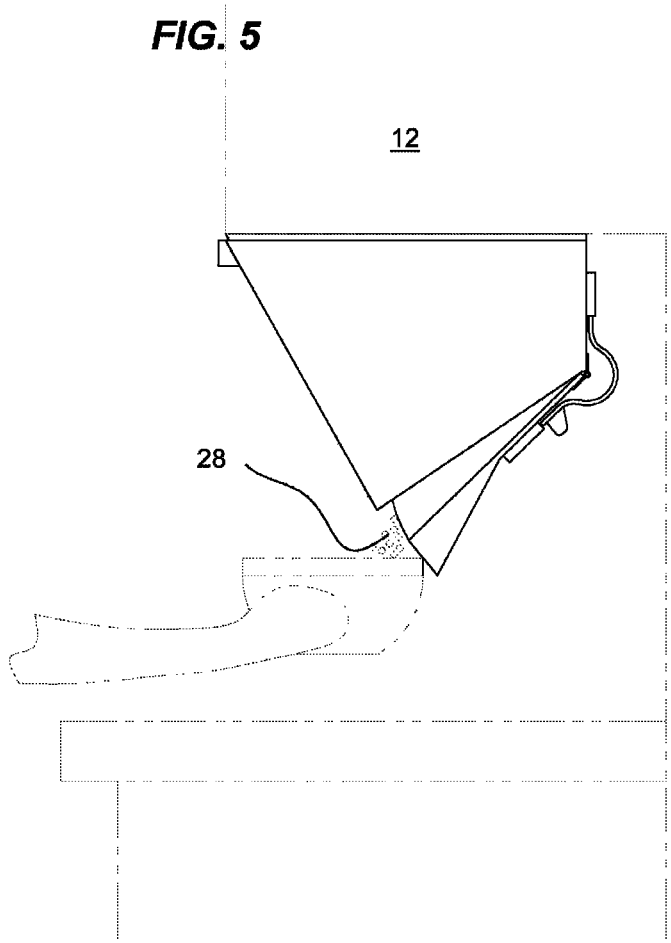
FIG. 5 Side view of the invention in context of use.

A granular food dispenser (10) installed under a cupboard (12) has a container bin (14) having four walls (15) and a dispensing hatch (16) located at the bottom of the bin (14).

The dispenser (10) is held in place underneath the cupboard (12) by a support bracket (18) having 4 sides and two of those sides have support channels (20) that are parallel. The support channels (20) are complementary to bin channels (22) located on the sides of the bin (14) so that by sliding the bin (14) into the support channels (20), the dispenser (10) is supported. The support bracket (18) is itself mechanically attached to the underside of the cupboard (12) by way of mechanical fasteners, or any other means known in the art such as adhesive means, for example. The dispensing hatch (16) has a adjustable biasing member (23) to keep it shut until being pulled downwardly by a user pulling on a handle (24). A flap (27) stops the flow of contents (28) so that the dispensing hatch (16) can close without interference from the content (28).

The adjustable biasing member (23) can have its level of resistance adjusted by pulling on a handle (30) which pulls on a ratcheted member (32) extending integrally therefrom. A user simply pulls upwardly on the handle (30) to disengage teeth (34) located on the ratcheted member (32) and then pull outwardly the ratcheted member (32) in order to decrease resistance, or simply pushes inwardly on the handle (30) to increase resistance as the teeth (34) slide over a catch (36). Ratcheting mechanisms are well known in the art and need not be further discussed herein.

Additional features include a window (26) located on the front of the bin (14) so that a user can monitor the level of contents (28) therein.

In order to refill the bin (14), the dispenser (10) is partially slid off the channels (20,22) so that new content (28) can be poured in and then, it is slid back in.

Figure 6:
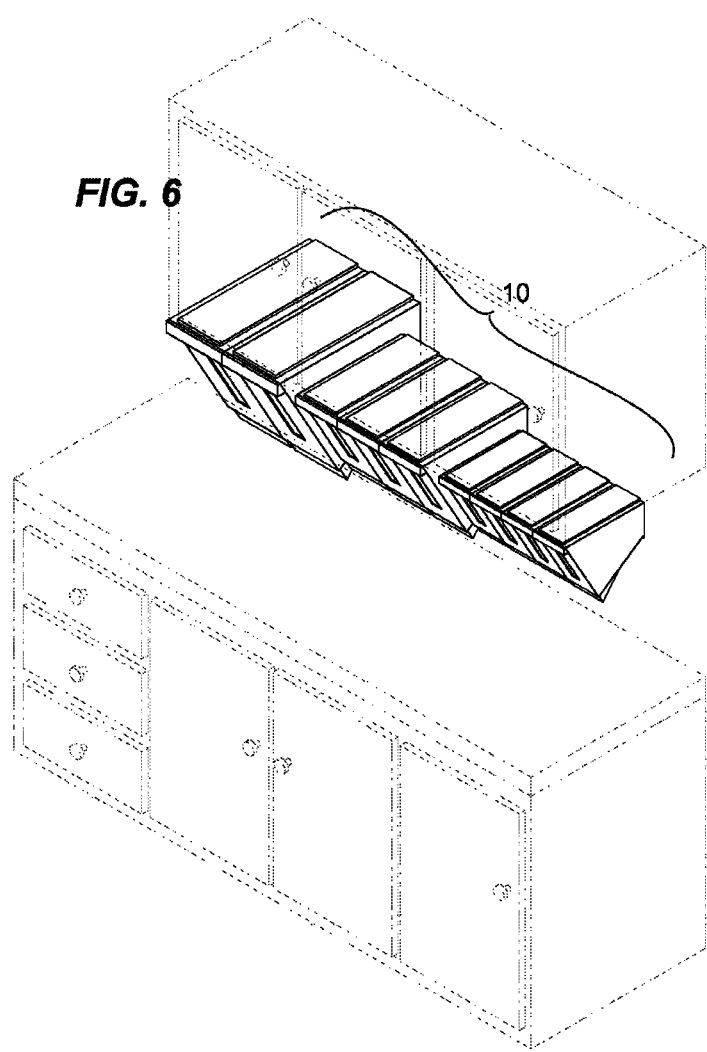
FIG. 6 Isometric view showing different sizes under cupboards.

A plurality of bins can be installed side by side under cupboards. The dispenser (10) can have many different sizes, as seen in FIG. 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, punch dies are the preferred tool used but other types of cutters such as rotary drill cutters could be used and still achieve a similar result.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A food dispenser for attaching underneath a cupboard, said dispenser comprising a bin member having four side walls and a dispensing hatch at a bottom portion thereof, and bin channels formed in top portions of two opposite of said side walls; and a support bracket adapted to be securely attached underneath said cupboard having four side edges, wherein two opposite side edges have support channels adapted to engage respective bin channels of said bin member opposite side walls, such that said bin member can slide on and off said support bracket; said dispensing hatch is pivotally attached to a bottom portion of one of said four side walls of said bin member, such that said hatch can be pivotally opened and closed such that food can be extracted from said bin member; and an adjustable biasing member attached between said one of said four side walls of said bin member and said dispensing hatch, such that a user must apply a pulling force to open said hatch and dispense food, and when done said adjustable biasing member pushes said hatch back into a closed position against said bottom portion of said bin member, said dispensing hatch includes a handle member adapted for a user to grab and pull down said dispensing hatch into an open position allowing food to be extracted.

2. The food dispenser of claim 1, further comprising a flap member that extends upwards therefrom and into the interior of said bin member, such that when the hatch is being closed said flap member stops the flow of said food from being dispensed and the hatch can close without interference from said food.

3. The food dispenser of claim 1, wherein an adjustable connection is provided between said adjustable biasing member and said dispensing hatch comprising a first connecting portion having a plurality of teeth aligned linearly, wherein said first connecting portion is attached to an underside of said dispensing hatch, and a second connecting portion located on said adjustable biasing member and having a complimentary tooth that is adapted to engage any one of said teeth of said first connecting portion.

4. The food dispenser of claim 1, wherein a substantial portion of said biasing member is formed in a flat rectangular shape that is adapted to extend and attach to a substantial portion of the length of said one of said four side walls and said dispensing hatch.

5. A combination of a cupboard and at least one food dispenser attached underneath said cupboard, said combination comprises a cupboard, and at least one food dispenser, wherein each of said at least one food dispenser comprises a bin member having four side walls and a dispensing hatch at a bottom portion thereof, and bin channels formed in top portions of two opposite of said side walls; and a support bracket adapted to be securely attached underneath said cupboard having four side edges, wherein two opposite side edges have support channels adapted to engage respective bin channels of said bin member opposite side walls, such that said bin member can slide on and off said support bracket; said dispensing hatch is pivotally attached to a bottom portion of one of said four side walls of said bin member, such that said hatch can be pivotally opened and closed such that food can be extracted from said bin member; and an adjustable biasing member attached between said one of said four side walls of said bin portion and said dispensing hatch, such that a user must apply a pulling force to open said hatch and dispense food, and when done said adjustable biasing member pushes said hatch back into a closed position against said bottom portion of said bin member, said dispensing hatch includes a handle member adapted for a user to grab and pull down said dispensing hatch into an open position allowing food to be extracted.

6. The combination of claim 5, further comprising a flap member that extends upwards therefrom and into the interior of said bin member, such that when the hatch is being closed said flap member stops the flow of said food from being dispensed and the hatch can close without interference from said food.

7. The combination of claim 5, wherein an adjustable connection is provided between said adjustable biasing member and said dispensing hatch comprising a first connecting portion having a plurality of teeth aligned linearly, wherein said first connecting portion is attached to an underside of said dispensing hatch; and a second connecting portion located on said adjustable biasing member and having a complimentary tooth that is adapted to engage any one of said teeth of said first connecting portion.

8. The combination of claim 5, wherein a substantial portion of said biasing member is formed in a flat rectangular shape that is adapted to extend and attach to a substantial portion of the length of said one of said four side walls and said dispensing hatch.

* * * * *